United States Patent [19]

East

[11] Patent Number: 4,757,202
[45] Date of Patent: Jul. 12, 1988

[54] SOLID STATE DOSIMETER

[75] Inventor: Philip C. East, Nepean, Canada

[73] Assignee: Canadian Patents & Development Limited, Ottawa, Canada

[21] Appl. No.: 884,006

[22] Filed: Jul. 10, 1986

[30] Foreign Application Priority Data

Jul. 24, 1985 [CA] Canada ................................ 487393

[51] Int. Cl.⁴ ............................ G01T 1/24; G01T 3/08
[52] U.S. Cl. .............................. 250/370.07; 250/390; 250/392; 250/394; 357/29
[58] Field of Search ............ 250/370 K, 370 F, 370 E, 250/370 C, 370 R, 392, 390 B, 390 R, 394; 357/29; 376/255

[56] References Cited

U.S. PATENT DOCUMENTS 4,163,240 7/1979 Swinehart et al. .................... 357/29
4,484,076 11/1984 Thomson ........................ 250/370 K
4,678,916 7/1987 Thomson ........................ 250/370 F

FOREIGN PATENT DOCUMENTS 1204885 5/1986 Canada ............................ 250/370 R
0148873 11/1981 Japan ............................. 250/370 R Primary Examiner—Janice A. Howell
Assistant Examiner—Constantine Hannaher
Attorney, Agent, or Firm—Yoshiharu Toyooka

[57] ABSTRACT

This invention provides a direct reading solid-state dosimeter which will measure neutron and gamma radiation. A dual metal-oxide-semiconductor field-effect transistor (MOSFET) is used as a gamma sensor and a forward biased PIN diode as a neutron sensor. A liquid crystal display is provided for displaying the gamma and neutron radiation dosage.

10 Claims, 3 Drawing Sheets

SOLID STATE DOSIMETER

BACKGROUND OF THE INVENTION

This invention relates to direct reading dosimeters and more particularly to solid-state direct reading dosimeters which measure neutron and gamma radiation.

A requirement exists for military forces to measure combined dose from neutron and gamma radiation independent of the dose rate. The only device currently available which will meet this requirement is the 1M185, an evacuated quartz-fibre pen dosimeter, developed by the US Army.

The problem associated with this prior art device is that it is relatively expensive and can only be used in conjunction with its charging unit. The dosimeter must be recharged to compensate for loss of electrical charge and pumped to ensure an adequate vacuum in the chamber.

U.S. Pat. No. 4,484,076 which issued Nov. 20, 1984 to Ian Thompson discloses a direct reading dosimeter for use by personnel workers in the medical, nuclear and industrial field. This dosimeter provides an indication of dose rate as well as total received dosage. This prior art dosimeter will, however, only measure gamma radiation. This dosimeter utilizes a single commercial type MOSFET. These MOSFET's offer a sensitivity in the range of 0.1-0.2 mV/rad (mV/cGy). The operating gate voltage would therefore have to be balanced to within 1 or 2 mV and adjusted for each device for an operating gate-to-source voltage of 4 to 6 volts. Long term drift is fairly common for these type of circuits, accordingly an undesirable periodic adjustment of the gate voltage would be required.

The change in gate voltage, for a specified operating drain current, with a change in temperature of only a few degrees could be several millivolts and would accordingly affect the accuracy of the measured dosage.

It is therefore an object of the present invention to provide a solid state dosimeter which will measure gamma and neutron radiation.

Another object of the present invention is to provide a solid state dosimeter having an increased sensitivity.

Yet another object of the present invention is to provide a solid state dosimeter which is relatively insensitive to temperature changes and requires no operator adjustments.

SUMMARY OF THE INVENTION

Accordingly there is provided, a direct reading solid state dosimeter comprising: means for sensing gamma radiation; means for sensing neutron radiation; means for measuring gamma radiation dosage from said gamma radiation sensing means; means for measuring neutron radiation dosage from said neutron radiation sensing means; and means for displaying said gamma and neutron radiation dosage.

BRIEF DESCRIPTION OF THE DRAWINGS

Particular embodiments of the invention will be understood in accordance with the following drawings in which.

DESCRIPTION OF THE PREFERRED EMBODIMENTS

Figure 1:
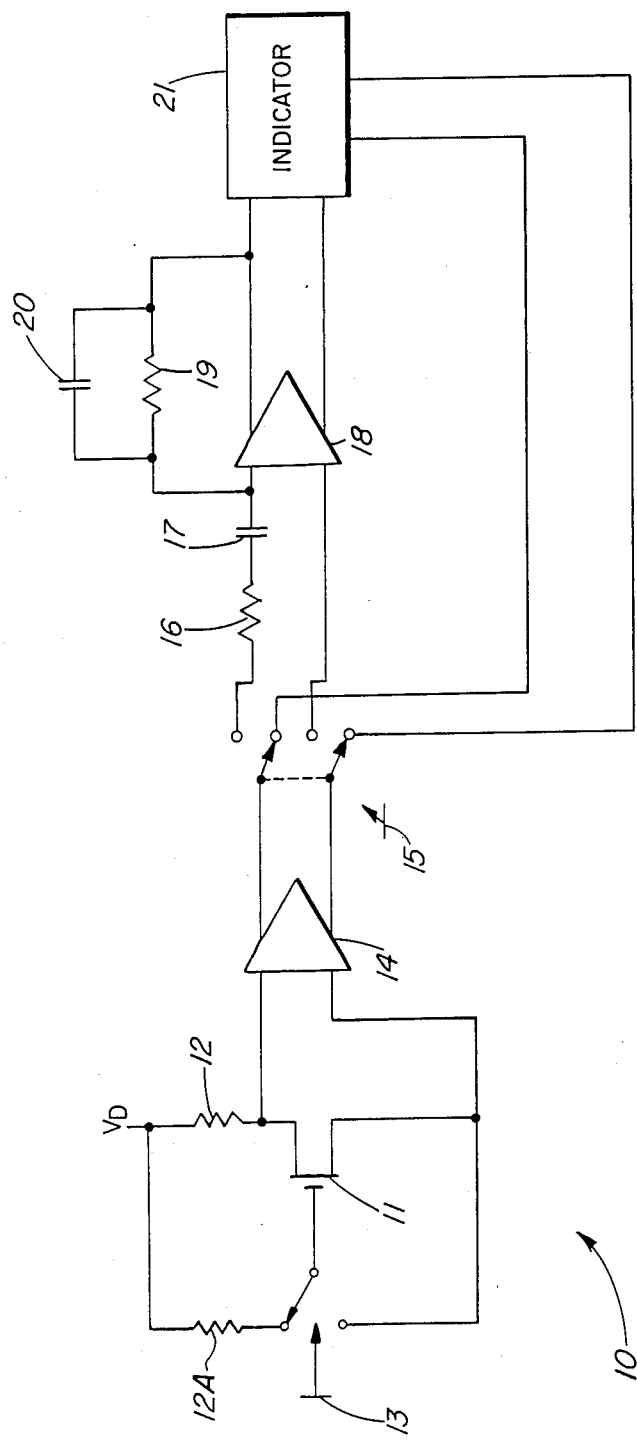
FIG. 1 is a direct reading dosimeter according to the prior art.

Referring now to FIG. 1, shown at reference numeral 10 is a schematic diagram of a direct reading dosimeter used in the prior art. A MOSFET device 11 is connected at its source to supply VD through resistor 12 to provide a current to the source of the MOSFET.

The drain of the MOSFET device 11 is connected to ground, and its gate through switch 13 the other switched terminal of switch 13 is connected to supply VD through resistor 12A. The source of MOSFET 11 is connected to the input of amplifier 14, the output of which is connected through switch 15 to a differentiating circuit. The circuit is comprised of resistor 16 in series with capacitor 17 which is connected to the input of operational amplifier 18. The output of op-amp 18 is connected to its inverting input through resistor 19 in parallel with capacitor 20.

The output of amplifier 18 is connected to indicator 21. The switch 15 is also connected to indicator 21. Switch 15 has one position which indicates dose rate by measuring the output from amplifier 18 and the other positive which indicates the total dose.

Figure 2:
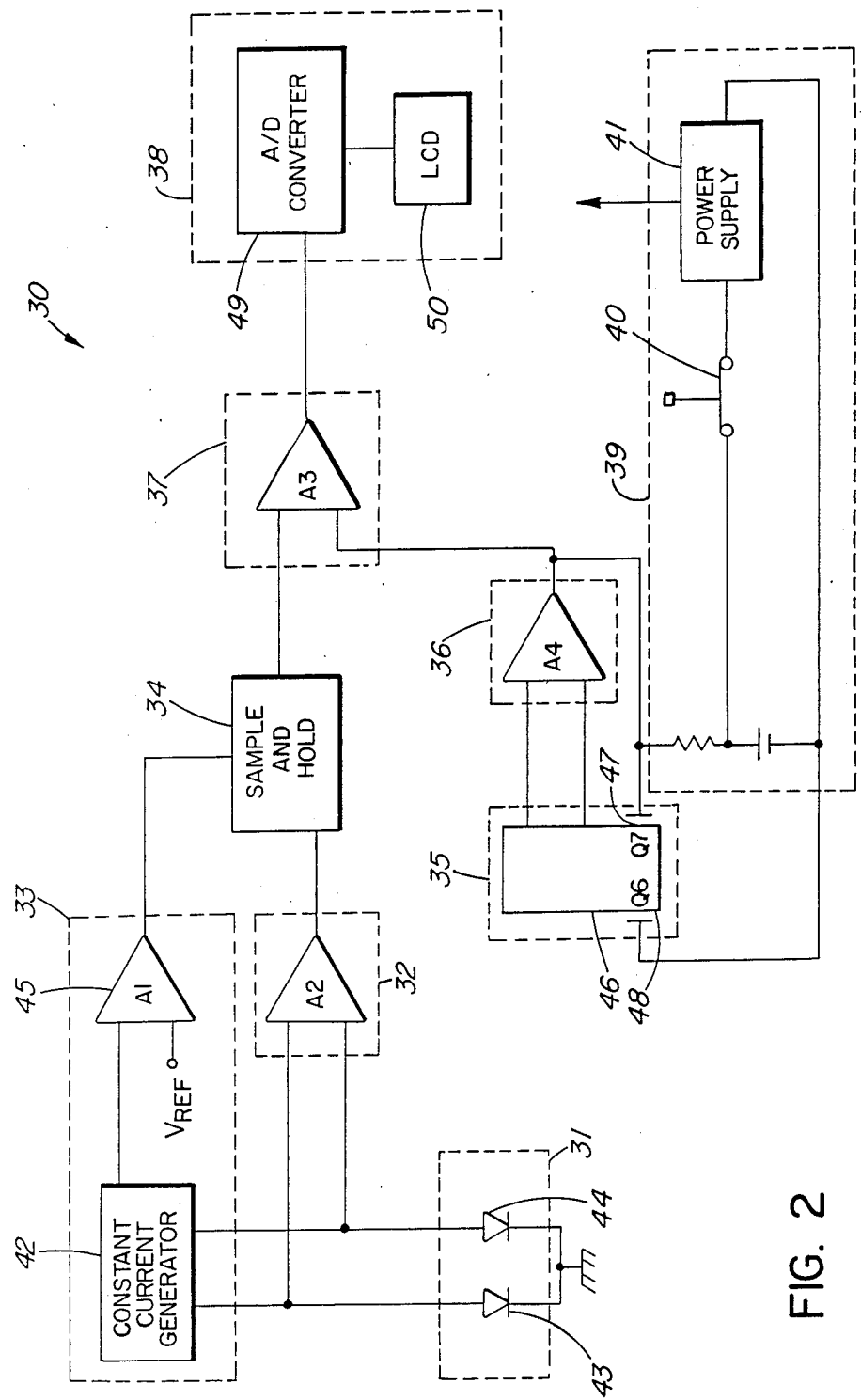
FIG. 2 is a block diagram of a solid state direct reading dosimeter according to the present invention.

Referring now to FIG. 2, reference numeral 30 shows a block diagram of a solid-state dosimeter according to the present invention. The dosimeter is generally comprised of a neutron radiation sensor means 31, neutron radiation measuring means 32 and current supply means 33 for the neutron radiation sensor means 31. A sample and hold circuit means 34 is provided to store the measured signal from the neutron measuring means 32. The dosimeter is further comprised of gamma sensor means 35, gamma radiation measuring means 36. Summing means 37 is provided to add the output of the sample and hold circuit means 34 and the output of the gamma radiation measuring means 36. The output of summing means 37, which is proportional to the accumulated neutron and gamma dose, is fed to display means 38 for monitoring by an operator. Power supply means 39 provides the required voltages to activate the circuit 30.

In order to read the accumulated neutron and gamma dose, push-button switch 40, is closed, turning on the regulated power supply 41 which activates the circuit 30. Once activated, a constant current generator 42 drives a 25 mA pulse through reference diode 43 and a 25 mA pulse through neutron diode 44. These currents are maintained constant for about two milliseconds.

Any differences in the voltages across the neutron diode 44 and the reference diode 43 is amplified by op-amp 32 and stored in the sample and hold circuit 34. This voltage is proportional to the accumulted neutron dose.

Timing of the constant current generator 42 is controlled by comparator 45.

The neutron diode 44 is a PIN diode which is used to measure the dose from fast neutrons. Exposure to fast neutrons increase the forward voltage of the diode at a constant current. The neutron diode is preferably of a type DN-156 manufactured by Harshaw/Filtrol. The reference diode 43 is a commercially available monolithic device which is insensitive to neutron radiation.

The gamma sensor 35 is comprised of a dual MOSFET 46. Exposure to gamma rays increases the gate threshold voltage of the MOSFET because some of the holes, from the hole-electron pairs produced in the oxide, are captured by dominant hole traps near the silicon/silicon dioxide interface. The biased MOSFET 47 is more sensitive to gamma radiation because as the MOSFET is being irradiated, less of the hole-electron pairs recombine when under the influence of an electric field and the holes are forced further away from the gate toward the dominant hole traps. The gate, drain and source of the MOSFET 48 are the same potential and its gate threshold voltage is relatively insensitive to gamma radiation.

The MOSFET device used as a gamma sensor uses a thicker oxide layer than commonly available from commercial MOSFET devices.

A MOSFET device with a thicker oxide layer is more sensitive to gamma radiation for two reasons: 1. The increased volume permits more trapped positive charge. 2. The reduced capacity. The gate capacity is inversely proportional to the thickness of the insulating oxide.

Therefore, for a gate capacity $C=(A/d)$; where A is a constant and d is oxide thickness; and since the potential $V=(Q/C)=(Q\cdot d/A)$ where Q is the charge, then $\Delta V=(\Delta Q\cdot d/A)$ The change in potential is directly proportional to the change in charge.

The sensitivity of an unbiased device have been measured to be about 0.5 mV/rad (mV/cGy) change in the source to gate voltage. A biased device on the other hand, depending on oxide layer thickness and bias voltage will be several times more sensitive.

A commercially available MOSFET such as a CD 4007 with an oxide layer of 0.11 μm will have a maximum sensitivity of 0.40 mV/rad when biased. Whereas a MOSFET device having an increased oxide layer thickness of, say, 0.5 μm will have a sensitivity up to 6 or 7 mV/rad when biased.

Accordingly the use of custom MOSFET devices offers considerably higher radiation sensitivity than commercially available devices and hence provide a considerably more sensitive dosimeter than a dosimeter using commercially available MOSFET devices. It will be understood by those knowledgeable in this art that these custom MOSFET devices with thicker oxide layers can be manufactured using known methods and therefore need not be discussed further.

The dual MOSFET 46 is connected into a feedback loop with amplifier 36. With the output of amplifier 36 connected to the gate of the biased half 47, any change in the output of amplifier 36 is a direct measure of the difference in the gate voltage change and is proportional to the accumulated dose. The output of amplifier 36 and the sample and hold circuit 34 are connected to summing amplifier 37. The output of summing amplifier 37, which is proportional to the accumulated neutron and gamma dose, is fed to an analogue to digital convertor 49 which activates a three digit liquid crystal display (LCD) showing the accummulated dose.

Figure 3:
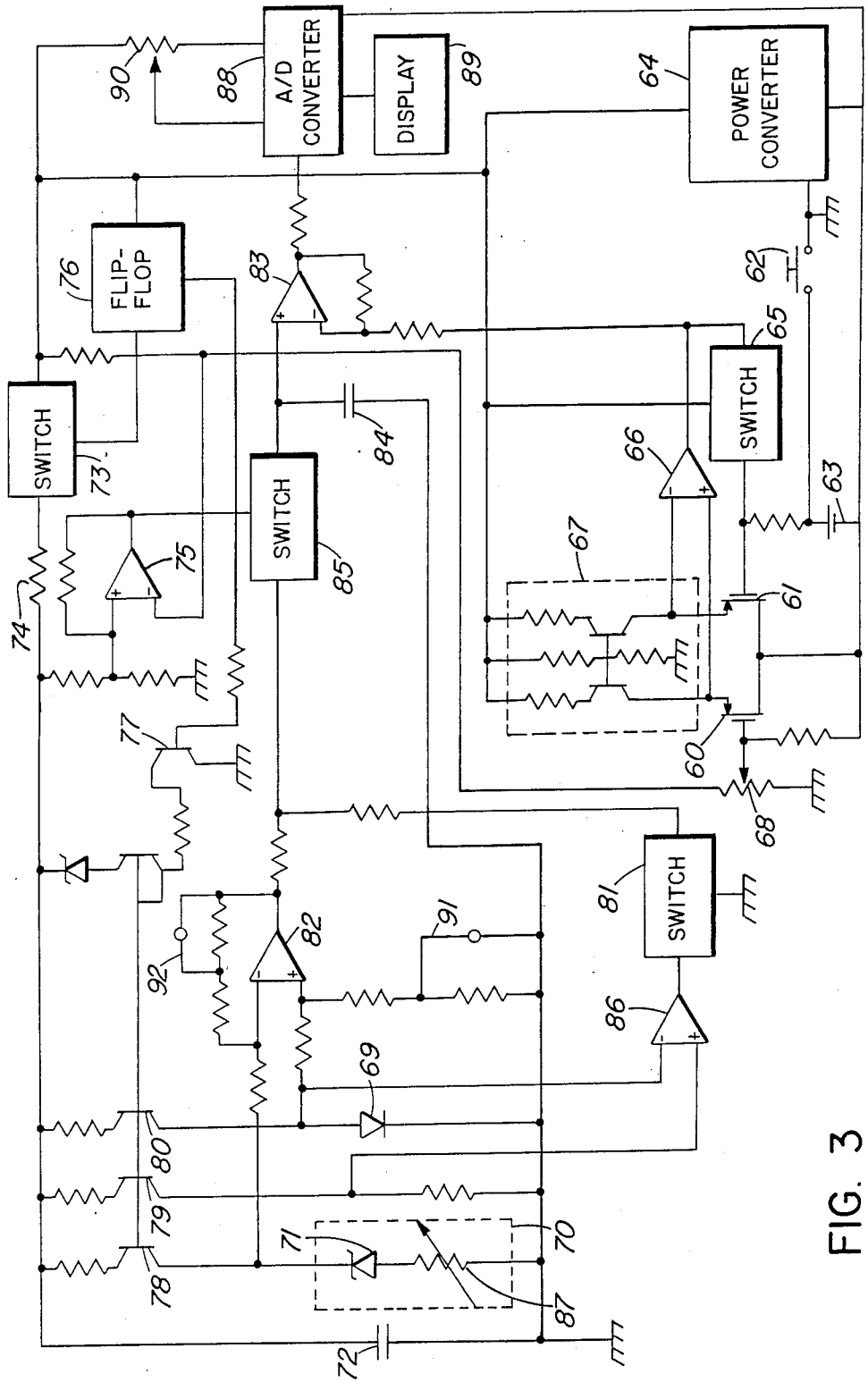
FIG. 3 is a detailed schematic diagram of the solid state direct reading dosimeter according to the present invention.

A more detailed schematic diagram of the solid state dosimeter according to a preferred embodiment of the invention is shown in FIG. 3. The gamma sensor consist of a dual MOSFET, 60 and 61. With push-button switch 62 open (as shown) the battery voltage 63 is applied as a bias to the gate of transistor 61.

When exposed to gamma radiation, positive charges are trapped in the SiO$_2$ gate insulation increasing the operating gate to source voltage. The change in the gate voltage, for a 2.8 V bias, is about 1.5 mV/rad (mV/cGy). A differential system is used to measure gamma radiation wherein transistor 60 is the reference transistor and transistor 61 is the sensing transistor.

The gate threshold voltage of reference transistor 60, with its gate, drain and source at the same potential is relatively insensitive to radiation.

To read the accumulated dose, switch 62 is closed connecting the 2.8 V battery 63 to the converter 64 which applies +10 Volts to the circuit. With power applied, switch 65 is closed connecting the output of amplifier 66 to the gate of transistor 61. The transistor/resistor combination 67 acts as current source for the dual MOSFET 60 and 61. Since MOSFET 60 and 61 are included in the feedback loop around amplifier 66, the output of amplifier 66 is a direct measure of the differential change in gate voltage due to gamma radiation.

The gate of the reference transistor 60 is connected to a potentiometer 68 which can be adjusted to set the output of amplifier 66 is zero. Initially, before irradiation, transistors 60 and 61 have the same gate to source voltage, about 6 to 7 volts, once irradiated the gate voltage can be offset up to about 2 volts so that a total gamma dose of over 2000 rad (cGy) can be measured before the MOSFET need be replaced.

A differential system is also used for the neutron dose measurement. The forward voltage across the first neutron diode 69 is compared to the voltage across a reference diode/resistor combination 70 when both sensing diode 69 and reference diode 71 are pulsed with a constant 25 mA current. When switch 62 is closed and power applied to the circuit, capacitor 72 is charged via switch 73 and resistor 74. When the voltage across capacitor 72 approaches 95% of the supply voltage, the output of comparator 75 goes high causing the following:

1. Flip-flop 76 is triggered turning off switch 73.
2. Transistor 77 is turned on, switching on the constant-current stages of transistors 78, 79 and 80.
3. Switch 85 is closed, connecting the output of amplifier 82 to the positive input of amplifier 83 and capacitor 84.

When the voltage across capacitor 72 falls to about 6 volts which is the voltage necessary to maintain the constant current stages in the linear region, the output of comparator 75 goes low, opening switch 85 and turning off transistor 77. Any change in the voltage across the fast—neutron diode 69, and amplified by amplifier 82 is now stored on capacitor 84. The voltage stored on capacitor 84 is proportional to the neutron dose.

The neutron diode sensitivity, the forward voltage change per unit dose, is non-linear, the sensitivity increasing with increasing dose. Accordingly, compensation is required as the dose increases. When the forward voltage of the fast neutron diode 69 exceeds 1.73 volts, corresponding to a dose of 50 rads (cGy), switching comparator 86 turns switch 81 on.

The neutron diode circuit can also be reset to read zero after being irradiated. This can be achieved by adjustment of the potentiometer 87 of the reference diode/resistor combination 70. The circuit can be reset up to a total accumulated neutron radiation dose of 500 rads (cGy).

The output of summing amplifier 83 is proportional to the sum of the gamma dose from the output of amplifier 66 and the neutron dose from the output of amplifier 82. The output of the summing amplifier 83 is then fed to an analog-to-digital converter 88 which drives a three digit LCD 89. The display 89 indicates the total dose in 10 rads steps up to 990 rads. The display 89 is set to read correctly by adjustment of potentiometer 90 which controls the sensitivity of the analog-to-digital converter 88.

The dosimeter reading can be sensitive to temperature during the read cycle since both the forward voltage of the fast neutron diode 69 and the gate voltage of the MOSFET, vary with temperature. Accordingly compensation, in the case of the MOSFET, is provided by using a dual device in a differential circuit. The change in output voltage, over the full temperature range, can be expected to be less than 5 millivolts and should be less than 10 rad (cGy).

Temperature compensation for the first neutron diode 70 is offered by the use of thermistors 91 and 92.

The embodiments of the invention in which an exclusive property or privilege is claimed are defined as follows:

1. A direct reading solid state dosimeter comprising: means for sensing gamma radiation including a dual Metallic-Oxide semiconductor Field-Effect transistor (MOSFET) device; means for sensing neutron radiation; means for measuring gamma radiation dose from said gamma radiation sensing means; means for measuring neutron radiation dose from said neutron radiation sensing means; and means for displaying said gamma and neutron radiation dose.

2. A dosimeter as defined in claim 1 wherein said neutron radiation sensing means include fast-neutron diode device.

3. A dosimeter as defined in claim 2 wherein said dual MOSFET device includes biased and unbiased MOSFET devices, said biased MOSFET device being sensitive to gamma radiation and said unbiased MOSFET device being relatively insensitive to gamma radiation.

4. A dosimeter as defined in claim 3 wherein said gamma radiation dose measuring means includes differential amplifier means to measure the difference in gate voltage change between said biased and unbiased MOSFET devices, said difference in voltage being proportional to the gamma dose.

5. A dosimeter as defined in claim 2 wherein said neutron radiation dose measuring means includes differential amplifier means to measure the difference in voltage across the fast-neutron diode and a reference diode, said difference in voltage being proportional to the neutron dose.

6. A dosimeter as defined in claim 1 wherein summing amplifier means is used to add the gamma and neutron dose.

7. A dosimeter as defined in claim 1 wherein said gamma and neutron dose is converted to digital form by analog to digital converter means.

8. A dosimeter as defined in claim 7 wherein said display means includes a Liquid Crystal Display.

9. A dosimeter as defined in claim 1 wherein said dual MOSFET device has an increased oxide layer thickness such that an increased gamma radiation sensitivity is provided by said MOSFET device.

10. A dosimeter as defined in claim 9 wherein said oxide layer thickness is more than 0.2 $\mu$m.

* * * * *